US012670760B2

(12) United States Patent
Cruickshank

(10) Patent No.: US 12,670,760 B2
(45) Date of Patent: Jun. 30, 2026

(54) MEDIA ITEM VALIDATION FOR MEDIA TERMINALS

(71) Applicant: Cardtronics USA, Inc., Atlanta, GA (US)

(72) Inventor: Jordan Cruickshank, Dundee (GB)

(73) Assignee: Cardtronics USA, Inc., Atlanta, GA (US)

( * ) Notice: Subject to any disclaimer, the term of this patent is extended or adjusted under 35 U.S.C. 154(b) by 0 days.

(21) Appl. No.: 18/813,474

(22) Filed: Aug. 23, 2024

(65) Prior Publication Data

US 2026/0057727 A1 Feb. 26, 2026

(51) Int. Cl.
*G07D 11/25* (2019.01)
*G07D 7/12* (2016.01)
*B07C 5/34* (2006.01)

(52) U.S. Cl.
CPC ............... *G07D 11/25* (2019.01); *G07D 7/12* (2013.01); *B07C 5/34* (2013.01); *B07C 5/3412* (2013.01)

(58) Field of Classification Search
CPC . G07D 11/25; G07D 7/12; B07C 5/34; B07C 5/3412; B07C 5/3422
See application file for complete search history.

(56) References Cited

U.S. PATENT DOCUMENTS 5,992,601 A * 11/1999 Mennie .................... G07D 7/04 194/207
7,212,948 B2 * 5/2007 Voser ..................... G07D 7/187 702/182

(Continued)

FOREIGN PATENT DOCUMENTS

EP 0708411 1/2003
EP 1349119 A2 * 10/2003 .............. G07D 7/12

OTHER PUBLICATIONS

"European Application Serial No. 25191939.5, Extended European Search Report mailed Jan. 23, 2026", 10 pgs.

(Continued)

*Primary Examiner* — Michael McCullough
*Assistant Examiner* — Kalyanavenkateshware Kumar
(74) *Attorney, Agent, or Firm* — Schwegman Lundberg & Woessner, P.A.

(57) ABSTRACT

Improved counterfeit detection in media terminals is provided using a multiple media item validator approach. A first validator analyzes received media items to identify potentially suspect items. Suspect items are routed to a second validator for more detailed analysis, while non-suspect items bypass the second validator. The second validator, equipped with higher resolution imaging and advanced detection capabilities, determines if suspect items are genuine or counterfeit. This selective routing maintains efficient processing while enhancing counterfeit detection accuracy. In an embodiment, additional media item validation features are provided such as substrate validation sensors and lasers for detecting specific security features. In an embodiment, during maintenance periods, the terminal can reprocess stored media items through the validators to resort and recategorize items. This approach improves counterfeit detection, reduces unnecessary rejections, and enhances overall efficiency and accuracy of media handling in terminals.

20 Claims, 4 Drawing Sheets

(56) References Cited

U.S. PATENT DOCUMENTS

| | | | | |
|---|---|---|---|---|
| 8,403,148 | B2 * | 3/2013 | Lubbers | B07C 5/3412 209/583 |
| 2003/0081824 | A1 | 5/2003 | Mennie et al. | |
| 2013/0088712 | A1 | 4/2013 | Holl et al. | |
| 2016/0253635 | A1 * | 9/2016 | Marquardt | G06Q 30/0185 705/39 |

OTHER PUBLICATIONS

Tascioglu, Didem, "Physically unclonable security patterns created by electrospinning, and authenticated by two-step validation method", Nanotechnology, IOP Publishing, England, vol. 33, No. 9, Dec. 9, 2021, 10 pgs.

* cited by examiner

MEDIA ITEM VALIDATION FOR MEDIA TERMINALS

BACKGROUND

Media terminals, such as automated teller machines (ATMs) and self-service terminals (SSTs), face an ongoing challenge in accurately detecting counterfeit bills while maintaining efficient transaction speeds. Current bill validation systems typically rely on a single bill or note validator that must process notes quickly, often within a fraction of a second, to avoid customer delays. This time constraint limits the depth and accuracy of counterfeit detection, potentially allowing sophisticated fake bills to slip through. Additionally, notes initially categorized as "suspect" may be unnecessarily rejected due to insufficient analysis time, leading to customer frustration and increased maintenance calls. The industry needs a solution that can enhance counterfeit detection accuracy without significantly impacting processing speeds or requiring a complete overhaul of existing terminal designs.

DETAILED DESCRIPTION

Figure 1:
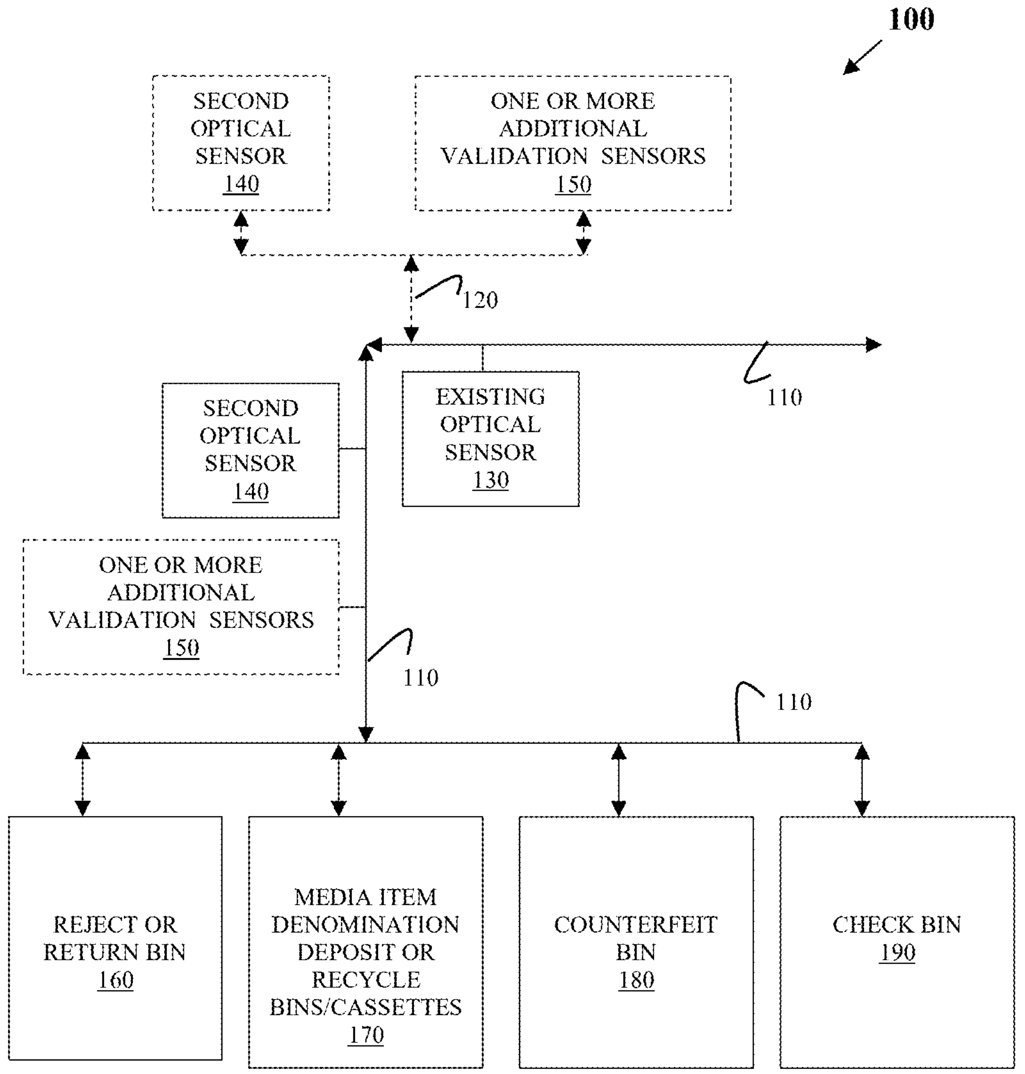
FIG. 1 is a diagram illustrating a media transport path within a media terminal with media item validators, according to an example embodiment.

Media terminals, such as automated teller machines (ATMs) and self-service terminals (SSTs), face significant challenges in accurately detecting counterfeit bills while maintaining efficient transaction speeds. Current bill validation techniques typically rely on a single validator that must process notes rapidly, often within a fraction of a second, to avoid customer delays. This time constraint severely limits the depth and accuracy of counterfeit detection, potentially allowing sophisticated fake bills to slip through undetected.

The existing single-validator approach faces several key issues. First, the short processing time means that only low-resolution images and basic functions can be used to determine the legitimacy of a given media item. This limitation increases the risk of accepting counterfeit notes, especially as counterfeiting techniques become more advanced. Second, notes initially categorized as "suspect" may be unnecessarily rejected due to insufficient analysis time, leading to customer frustration and increased maintenance calls. Finally, the current system lacks the flexibility to adapt to new security features or emerging counterfeit techniques without significant hardware and software upgrades.

Embodiments of the invention address these challenges through an innovative multiple validator approach integrated into the media terminal. This approach maintains the high-speed processing of the existing first validator for most media items, while selectively routing potentially suspect items to a second, more advanced validator. The second validator, equipped with higher resolution imaging capabilities and, in some embodiments, additional sensors, which perform a more thorough media item analysis without slowing down the overall transaction process for the majority of media items.

In an embodiment, the second validator is equipped with a higher-resolution image sensor, allowing for more detailed analysis of media items flagged as potentially suspect by the first validator. This higher-resolution capability enables the detection of fine details and security features that may be missed by the initial, rapid scan. The second validator can take more time to process suspect items without slowing down the overall transaction speed for the majority of media items that pass the initial validation.

This multiple validator approach solves the core industry problems in several ways. It improves counterfeit detection accuracy by allowing for more detailed analysis of suspect items, reducing the risk of accepting sophisticated fakes. It also minimizes unnecessary rejections by providing a second chance for thorough validation of suspect items, potentially reducing customer frustration and maintenance calls. Furthermore, the system's flexibility allows for the incorporation of optional advanced detection technologies, such as substrate testing and laser-based feature detection, enabling the terminal to adapt to new security features and counterfeit techniques over time.

In some embodiments, the second validator or an additional third validator incorporates advanced detection technologies to further enhance counterfeit detection capabilities. These may include substrate testing for polymer notes, which can detect counterfeits with extreme accuracy. Additionally, laser-based detection systems can be employed to identify specific features present in genuine notes, such as those found in clear windows on polymer currency. These advanced sensing technologies provide an extra layer of security, allowing the media terminal to adapt to increasingly sophisticated counterfeiting techniques.

The multiple validator system also offers enhanced functionality during maintenance periods. When the media terminal is not in active use, it can reprocess bills stored in cassettes through the additional bill validator(s). This feature allows for a thorough re-evaluation of all stored media items, ensuring proper sorting and reducing the risk of undetected counterfeits remaining in circulation. During this process, notes can be resorted based on denomination, rejected notes, and identified counterfeits, improving the overall efficiency of cash management within the terminal.

As used herein, a "media item validator" includes one or more sensors and corresponding software instructions executed by a processor of a media terminal for purposes of validating that a media item is genuine, counterfeit, or damaged such that it is not fit for continued use. The sensors include optical sensors, spectroscopic sensors, capacity sensors, optical coherence tomography (OCT) sensors, thickness and density sensors, magnetic sensors, fluorescence and phosphorescence sensors, and/or moisture content sensors. The optical sensors include photodetector sensors, image sensors, light-dependent resistor sensors, infrared (IR) sensors, fiber optic sensors, laser sensors, color sensors, proximity sensors, spectrometer sensors, optical interferometer sensors, and/or ultraviolet (UV) sensors.

The multiple media item validators work in concert to provide a comprehensive and accurate validation process. The first validator, with its rapid processing capabilities, serves as an initial screening mechanism for all media items. For items flagged as potentially suspect, the second validator, equipped with higher-resolution imaging and potentially additional sensors, performs a more thorough analysis. This layered approach allows for efficient processing of the majority of media items while dedicating more time and resources to those requiring closer scrutiny. In some embodiments, a third validator with advanced detection technologies further enhances the system's ability to detect sophisticated counterfeits.

The implementation of this multiple validator system offers several key benefits to media terminal operators and users. By providing more accurate categorization of notes (genuine fit, genuine unfit, suspect, counterfeit, or rejected), the system reduces the likelihood of unnecessary rejections and improves the overall user experience. Furthermore, the enhanced detection capabilities and maintenance mode functionality can potentially reduce ATM downtime and the frequency of service calls. This is achieved through better sorting of notes, more accurate detection of counterfeits, and the ability to reprocess and resort stored media items during off-peak hours. As a result, the system not only improves security but also contributes to increased operational efficiency and reduced maintenance costs for media terminal operators.

The diverse array of sensors and corresponding software algorithms employed in the media item validators enables the system to adapt to new security features and emerging counterfeit techniques over time. As currency issuers introduce more sophisticated anti-counterfeiting measures, such as complex optical features or specialized substrate compositions, the multiple validator approach allows for the integration of new sensing technologies without requiring a complete overhaul of the media terminal. This adaptability is particularly valuable in the context of the second or third validators, which can be updated or enhanced to detect the latest security features or counterfeit methods, ensuring the media terminal remains effective against evolving threats in the long term.

As used herein, "a media item" includes a currency note/cash/bill, a check, a valuable ticket, and/or a valuable voucher/certificate. During a transaction at a media terminal, a media item is inserted into a media infeed module of the media terminal for payment, change, credit, or a deposit by a customer. During the transaction, one or more media items may also be dispensed from the media terminal to the customer.

FIG. 1 is a diagram 100 illustrating a media transport path 110 within a media terminal with multiple sensors 130, 140, and optionally 150, according to an example embodiment. Notably, the components are shown schematically in simplified form, with only those components relevant to understanding of the embodiments being illustrated.

Furthermore, the various components (that are identified in diagram 100) are illustrated and the arrangement of the components are presented for purposes of illustration only. Notably, other arrangements with more or less components are possible without departing from the teachings of using multiple media item validators for media item validation or verification within a media terminal, presented herein and below.

During a transaction at a media terminal, a media item or a bunch of media items are inserted through a media infeed module and transported within the media terminal along media transport path 110. Any given media item is transported within the media terminal and deposited into a rejection or return bin 160, a media item denomination deposit or recycle bin/cassette 170, a counterfeit bin 180, or a check bin 190. Similarly, when the transaction dictates one or more media items are transported from media item denomination deposit or recycle bins/cassettes 170 along media transport path 110 and dispensed to a customer via a dual media infeed and outfeed module or via a dedicated media outfeed module of the media terminal. In some cases, a customer-provided media item associated with the transaction is provided back to the customer as a rejected media item from reject or return bin 160 along media transport path 110 to the media outfeed module of the media terminal. Any media item provided by the customer during a transaction that is deemed to be counterfeit moved along media transport path 110 and stored in counterfeit bin 180. Customer provided media items associated with non-cash, such as checks, valuable vouchers/certificates, or valuable tickets are stored in check bin 190.

Conventionally, because transactions must complete within fractions of a second at media terminals, there is typically just a single evaluation made along the media transport path 110 based on sensor data provided by an existing optical sensor 130. As a result, the existing optical sensor 130 provides fast but poor quality sensor data so that the media item evaluation can be performed rapidly for the transaction. For example, the existing optical sensor 130 may provide a low density image of the media item. The low density image data lacks fine grain image data of the media item which is necessary to improve the accuracy for validating the media item. Consequently, counterfeit media items are either not sufficiently detected resulting in a loss for the business associated with the corresponding transaction or genuine media items are deemed unnecessarily damaged and returned to the customer or deemed potentially counterfeit and retained by the media terminal, which results in customer frustration and potentially loss of customer business.

To solve these problems while retaining fast transaction throughputs, a second optical sensor 140 is situated along the media transport path 110. The second optical sensor 140 is only activated during a transaction when results of validation based on the sensor data provided by the existing optical sensor 130 indicates that a media item is potentially suspect. This can be achieved based on a score generated during the validation of the existing optical sensor's data for the media item such that when the score is below or above a predefined threshold or within a predefined threshold range, the media terminal activates the second optical sensor 140 for a further validation of the suspect media item. The second optical sensor 140 provides finer gain sensor data such as higher image resolution data from that which is provided in the existing optical sensor's data. In this way, only suspected counterfeit media items undergo a second validation, ensuring that the vast majority of transactions complete with sufficient throughput and subjecting only suspected media items associated with a small number of transaction to a slight delay in transaction throughput.

In an embodiment, one or more additional validation sensors 150 are situated along the media transport path 110 after the media terminal validates the media item based on the second optical sensor's data. These additional sensors can provide data for performing a variety of additional counterfeit tests or validations on the media item, such as substrate testing, testing for expected features present in the media items, Spark testing, Omni directional thread testing, and other types of media item testing.

In an embodiment, the media transport path 110 is enhanced to include a side path 110 off of the media transport path 110 for evaluation based on sensor data provided by the second optical sensor 140. Once the second optical sensor's data is provided to the media terminal for media item validation, the media item is urged back along side path 110 into media transport path 110. In an embodiment, side path 110 further accommodates one or more additional validation sensors 150 for additional counterfeit media item validation based on additional sensor data provided by the one or more additional validation sensors 150.

Again, FIG. 1 is shown in simplified form with only the components of the media terminal necessary for comprehending the techniques presented herein illustrated. Notably, the media terminal includes a variety of modules for bunching media items together, deskewing media items, escrowing media items, performing magnetic ink character recognition on media items associated with checks, etc. The media terminal further includes a variety of peripheral devices such as a card reader, wireless transceivers, a receipt printer, a touchscreen display, a scanner, a weigh scale, a combined scanner and weigh scale, a bag scale, an encrypted personal identification number (PIN) pad, etc.

Moreover, the locations of the existing optical sensor 130, the second optical sensors, and the optional one or more additional validation sensors 150 can be located in different locations along the media transport path 110. The locations presented are for illustration and can be configured differently based on the type of media terminal and the design for the media terminal.

Figure 2:
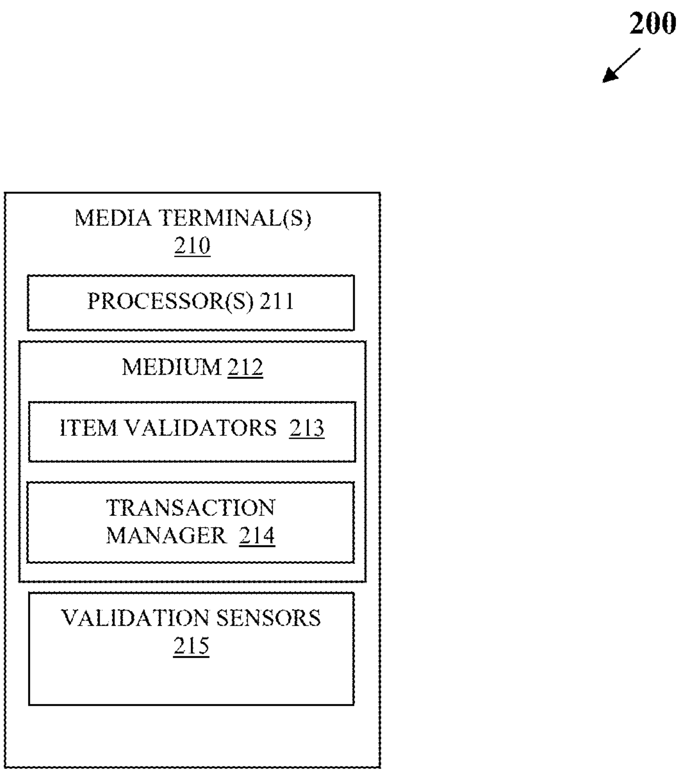
FIG. 2 is diagram of a system for media item validators, according to an example embodiment.

FIG. 2 is diagram of a system 200 for media item validators, according to an example embodiment. Notably, the components are shown schematically in simplified form, with only those components relevant to understanding of the embodiments being illustrated.

Furthermore, the various components (that are identified in system 200) are illustrated and the arrangement of the components are presented for purposes of illustration only. Notably, other arrangements with more or less components are possible without departing from the teachings of using multiple media item validators for media item validation or verification within a media terminal, presented herein and below.

System 200 includes a media terminal 210. The media terminal 210 includes at least one processor 211 and a memory of a non-transitory computer-readable storage medium 212, which includes instructions for item validators 213 and a transaction manager 214. The instructions when executed by processor 211 cause processor 211 to perform operations discussed herein and below with respect to item validators 213 and transaction manager 214. Media terminal 210 further includes validation sensors 215.

Transaction manager 214 controls and interacts with the item validators 213 and modules of the media terminal 210 for purposes of processing a transaction on behalf of a customer at the media terminal 210. In this way, transaction manager 214 is a transaction controller which interacts and controls the media terminal's modules and item validators 213 for transaction processing at the media terminal 210. The various media modules and/or peripheral devices of the media terminal 210 was discussed above with FIG. 1. Furthermore, the modules and/or peripheral devices include validation sensors 215.

Initially, a first item validator 213 validates a media item being transported along media transport path 110 within media terminal 210. The first item validator 213 evaluates a low resolution image provided in the sensor data of a first sensor 215 for specific image features and generates a first score for detected features and/or lack of detected features. When the first score is indicative of a clear non-counterfeit media item, the media item is transported along media transport path 110 to a media item denomination deport or recycle bin/cassette 170.

When the first score is below a predefined threshold, above a predefined threshold, or within a predefined threshold range, a second validation sensor 215 is activated along the media transport path 110. The first score is associated with a situation where the media item is a suspected counterfeit media item but cannot be clearly and decisively determined by the first item validator 213. As a result, a second item validator 213 evaluates sensor data provided from the second validation sensor 215 to generate a second score based on features detected for the media item present within the sensor data.

When the second score provided by the second item validator 213 is below a predefined threshold, above a predefined threshold, or within a predefined threshold range which indicates the media item is counterfeit, the media item is transport along media transport path 110 to a counterfeit bin 180 within the media terminal 210. When the second score is indicative of a non-counterfeit media item, the media item is transported along media transport path 110 to a media item denomination deport or recycle bin/cassette 170.

In an embodiment, one or more additional validation sensors 215 are activated when a preceding score for a preceding item validator 213 is indicative of a counterfeit item. Each additional validation sensor produces its own further score based on features detected in corresponding sensor data provided by a corresponding additional validation sensor 215.

In an embodiment, the one or more additional validation sensors 215 are activated regardless of a preceding score for a preceding item validator 213. This is done when the one or more additional validation sensors 215 are designed to provide a corresponding additional item validator 213 with sensor data associated with enhanced feature detection beyond that which a preceding validation sensor 215 can provide with its sensor data. For example, sensor data associated with features associated with the substrate associated with the media item, direction of the threads in the substrate of the media item, security features in the media item that are visible only certain spectrums of light, etc. Thus, the one or more additional validation sensors 215 and corresponding item validators 213 can be dependently chained together in a validation processing pipeline based on preceding feature scores or independently chained together in a validation processing pipeline independently of preceding feature scores.

In an embodiment, the media terminal 210 is an automated teller machine (ATM), a self-service terminal (SST), or a point-of-sale (POS) terminal operated by a teller or a cashier on behalf of a customer performing a transaction. In an embodiment, the validation sensors 215 include any combination of the sensors discussed above.

In an embodiment, two or more item validators 213 and corresponding validation sensors 215 are provided within media terminal 210. In an embodiment, the two or more item validators 213 are combined into a single set of instructions executed by processor 211 during transport of a media item along media transport path 110 within media terminal 210. In an embodiment, each of the two or more item validators 213 are a separate set of instructions executed by processor 211 during transport of a media item along media transport path 110 within media terminal 210.

Figure 3:
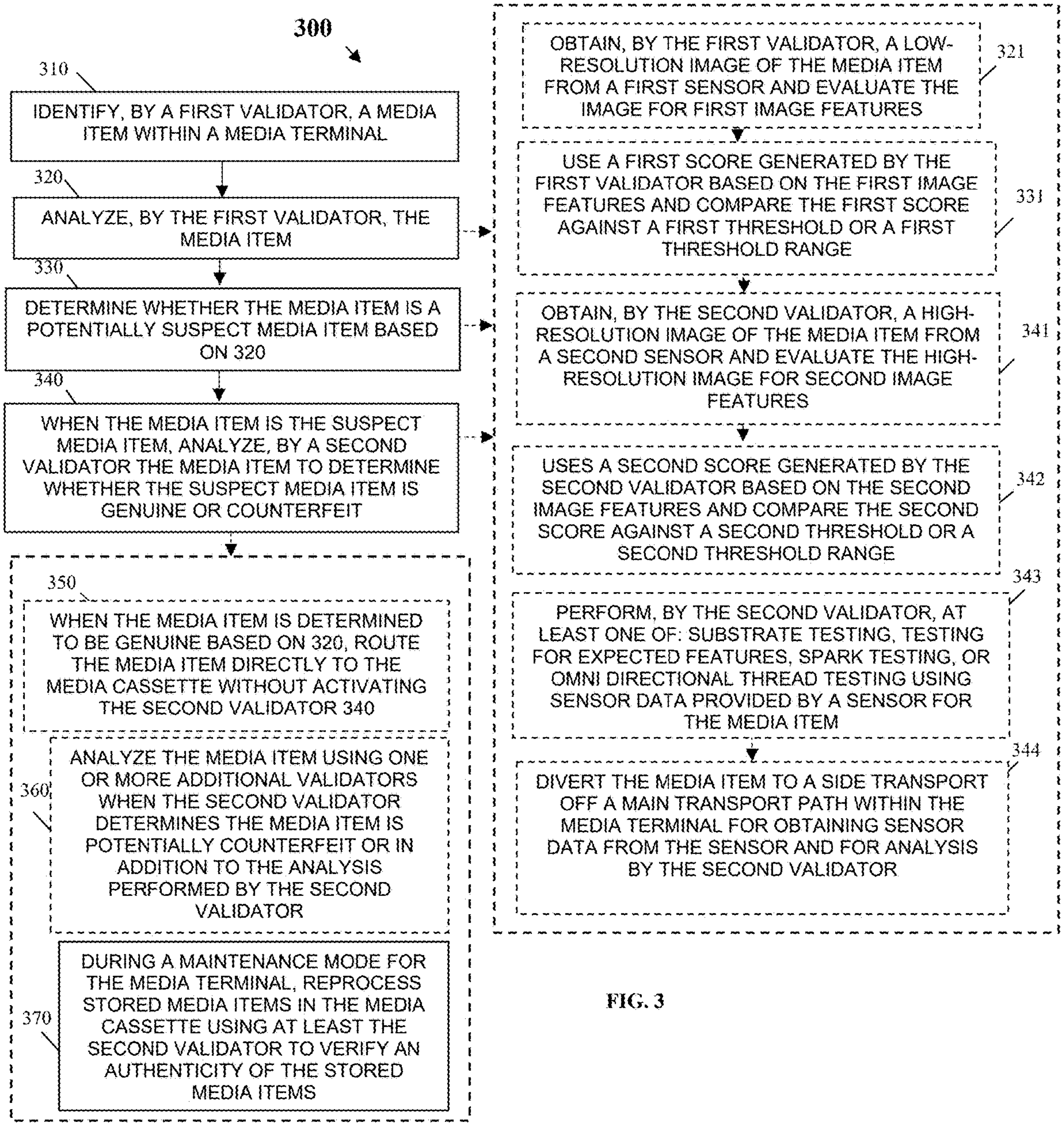
FIG. 3 is a flow diagram of a method for operating media item validators within a media terminal, according to an example embodiment.

FIG. 3 is a flow diagram of a method 300 for operating media item validators within a media terminal, according to an example embodiment. The method 300 is implemented as a set of software instructions executed by a processor of one or more devices. The software instructions are referred to herein as a "media validator."

In an embodiment, the device that executes the media validator is media terminal 210. In an embodiment, the media validator includes item validators 213 and transaction manager 214.

At 310 a first validator identifies a media item within a media terminal 210. The media validator receives sensor data provided from the first validator as the media item is urged along a media transport path 110 within the media terminal 210 for a transaction.

At 320, the first validator analyzes the media item. That is, the sensor data provided by a first validation sensor 215 is analyzed by the first validator. In an embodiment, at 321, the first validator obtains a low-resolution image depicting the media item from the first validation sensor 215. The first validator evaluates the low-resolution image for first image features.

At 330, the media validator determines whether the media item is a potentially suspect media item is genuine or counterfeit. In an embodiment of 321 and 330, at 331, the media validator uses a first score generated by the first validator based on the first features and compares the first score against a first threshold or a first threshold range to determine whether the media item is genuine or counterfeit.

At 340, the media validator identifies when the media item is the potentially suspect media item causing the second validator to analyze the media item for determining whether the potentially suspect media item is genuine or counterfeit. In an embodiment of 331 and 340, at 341, the second validator obtains a high-resolution image depicting the media item from a second validation sensor 215. The second validator evaluates the high-resolution image for second image features. In an embodiment of 341 and at 342, the media validator uses a second score generated by the second validator based on the second image features and compares the second score against a second threshold or a second threshold range to determine whether the media item is genuine or counterfeit.

In an embodiment, at 343, the second validator performs one or more of: substrate testing, testing for expected security features, Spark testing, and/pr Omni directional thread testing using sensor data provided by the second validation sensor 215 for the media item. In an embodiment, at 344, the media validator diverts the media item to a side transport off a main transport path within the media terminal 210 for obtaining the sensor data from the second validation sensor 215 and for analysis by the second validator.

In an embodiment, at 350, and when the media item is determined to be genuine based on 320, the media validator routes the media item directly to the media cassette without activating the second validator at 340. Thus, the second validator 340 only activates when the first validator is unsure as to whether the media item is genuine or counterfeit. When the first validator is confident that the media item is genuine, the second validator is not processed.

In an embodiment, at 360, the media validator uses one or more additional validators when the second validator determines the media item is potentially counterfeit or in addition to the analysis performed by the second validator. That is, the additional validators can follow the evaluation by the second validator and performed as additional security validation checks on the media item or the additional validators are only processed when the second validator's evaluation is unsure as to authenticity of the media item.

In an embodiment, at 370, and during a maintenance mode of operation for the media terminal 210, the media validator reprocesses stored media items in the media cassette using at least the second validator to verify an authenticity of the stored media items. The media items are urged along the media transport path 110 to pass one or more sensors associated with just the second validator or associated with both the first validator and the second validator. The media items are then categorized and stored appropriate in bins/cassettes 160, 170, and/or 180.

Figure 4:
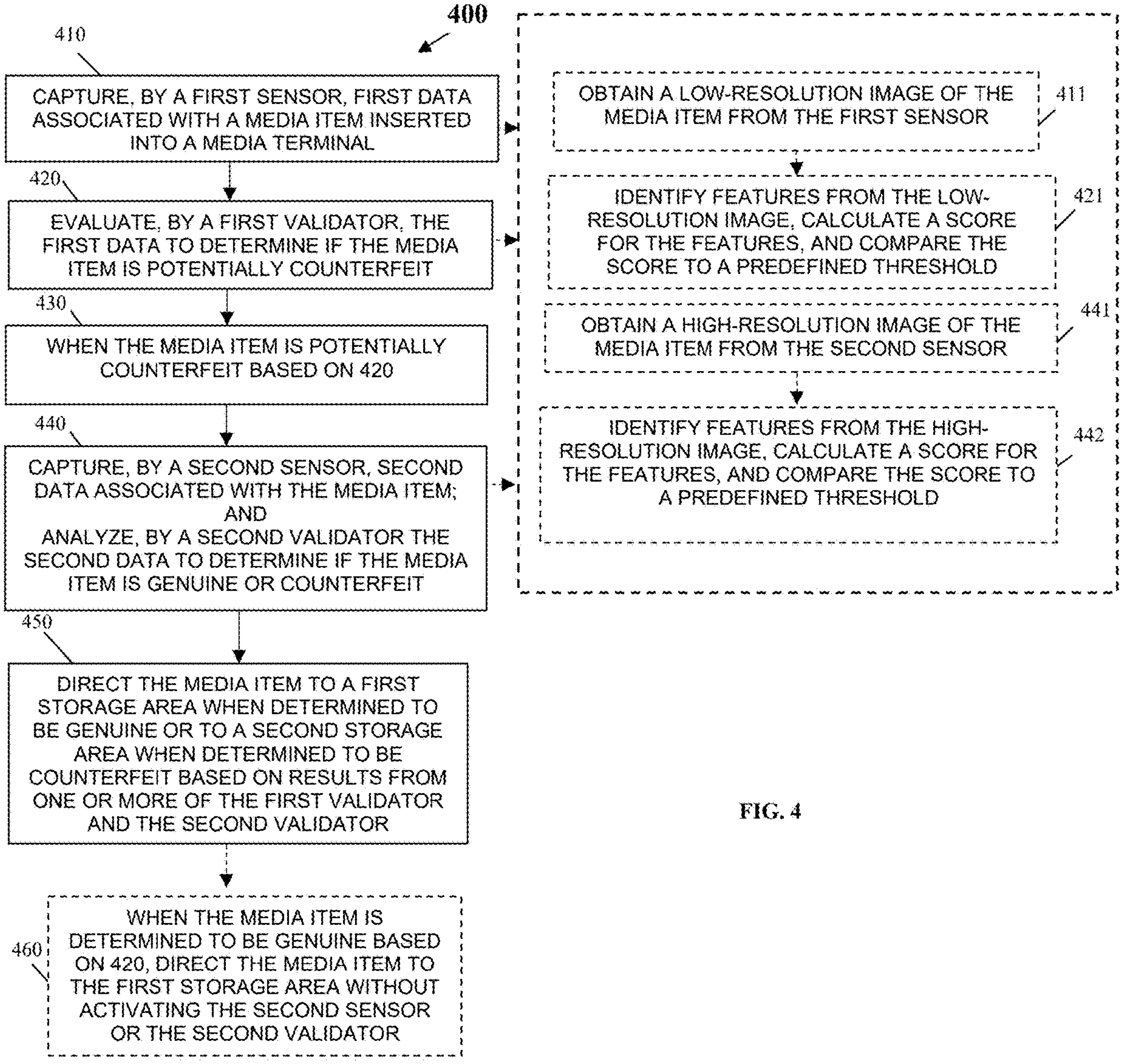
FIG. 4 is a flow diagram of another method of operating media item validators within a media terminal, according to an example embodiment.

FIG. 4 is a flow diagram of another method 400 for operating media item validators within a media terminal, according to an example embodiment. The method 400 is implemented as a set of software instructions executed by a processor of one or more devices. The software instructions are referred to herein as a "media validation manager."

In an embodiment, the device that executes the media validation manager is media terminal 210. In an embodiment, the media validation manager includes item validators 213, transaction manager 214, and/or method 300. The media validation manager presents another and enhanced processing perspective from that which was shown in method 300.

At 410, a first validation sensor 215 captures first data associated with a media item inserted into a media terminal 210. The media validation manager obtains the first data and provides the first data to a first validator. In an embodiment, at 411, the media validation manager obtains a low-resolution image for the media item from the first sensor.

At 420, the first validator evaluates the first data to determine if the media item is potentially counterfeit. In an embodiment of 411 and 420, at 421, the first validator identifies features from the low resolution image, calculates a score for the features, and compares the score to a predefined threshold to determine whether the media item is potentially counterfeit.

At 430, and when the media item is determined to be potentially counterfeit based on 420, a second validation sensor 215 at 440 captures second data associated with the media item. The media validation manager obtains the second data and provides to a second validator for evaluation. The second validator analyzes the second data to determine if the media item is genuine or counterfeit.

In an embodiment of 440 and at 441, the media validation manager obtains a high-resolution image for the media item from the second validation sensor 215 and provides to the second validator. In an embodiment of 441 and at 442, the second validator identifies features from the high-resolution image, calculates a score for the features, and compares the score to a predefined threshold to determine whether the media item is genuine or counterfeit.

At 450, the media validation manager directs the media item to a first storage area of the media terminal 210 when the media item is determined to be genuine to directs the media item to a second storage area of the media terminal 210 when the media is determined to be counterfeit. This is based on results received from one or more of the first validator and the second validator.

In an embodiment, at 460, and when the media item is determined to be genuine based on 420, the media validation manager directs the media item to the first storage area without activating the second validation sensor 215 of the second validator. That is, when the first validator is confident the media item is genuine, the second validator need not be activated or processed.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:

identifying, by a first validator, a media item within a media terminal;

analyzing, by the first validator, the media item;

determining whether the media item is a potentially suspect media item based on the analyzing by the first validator;

when the media item is the potentially suspect media item, selectively activating a second validator during a same transaction, wherein the second validator is activated based on a score generated by the first validator during the analyzing, and wherein the score is below a predefined threshold, above a predefined threshold, or within a predefined threshold range;

when the second validator is activated, analyzing, by a second validator, the media item to determine whether the potentially suspect media item is genuine or counterfeit; and routing the media item to a counterfeit bin for counterfeit media items or to a media cassette for genuine media items within the media terminal based on the analyzing associated with the first validator and the second validator.

2. The method of claim 1, wherein analyzing the media item, by the first validator, further includes obtaining, by the first validator, a first-resolution image of the media item from a first sensor and evaluating the first-resolution image for first image features.

3. The method of claim 2, wherein determining whether the media item is the potentially suspect media item further includes using a first score generated by the first validator based on the first image features and comparing the first score against a first threshold or a first threshold range.

4. The method of claim 3, wherein analyzing, by the second validator, further includes obtaining, by the second validator, a second-resolution image of the media item from a second sensor and evaluating the second-resolution image for second image features, wherein the second-resolution image is of a higher image resolution than the first-resolution image.

5. The method of claim 4, wherein analyzing, by the second validator, further includes using a second score generated by the second validator based on the second image features and comparing the second score against a second threshold or a second threshold range.

6. The method of claim 1, wherein analyzing, by the second validator, further includes performing, by the second validator, at least one of: substrate testing, testing for expected features, Spark testing, or Omni directional thread testing using sensor data provided by a sensor for the media item.

7. The method of claim 6, wherein analyzing, by the second validator, further includes diverting the media item to a side transport path off a main transport path within the media terminal for obtaining the sensor data from the sensor and for analysis by the second validator.

8. The method of claim 1, further comprising:

when the media item is determined to be genuine based on the analyzing by the first validator, routing the media item directly to the media cassette without activating the analyzing by the second validator.

9. The method of claim 1, further comprising:

analyzing the media item using one or more additional validators when the second validator determines the media item is potentially counterfeit or in addition to the analyzing by the second validator.

10. The method of claim 1, further comprising:

during a maintenance mode for the media terminal, reprocessing stored media items stored in the media cassette using at least the second validator to verify an authenticity of the stored media items.

11. A method, comprising:

capturing, by a first sensor, first data associated with a media item inserted into a media terminal;

evaluating, by a first validator, the first data to determine if the media item is potentially counterfeit;

when the media item is potentially counterfeit based on the evaluating by the first validator:

selectively activating a second sensor and second validator during a same transaction, wherein the second sensor and second validator are activated based on a score generated by the first validator during the evaluating, and wherein the score is below a predefined threshold, above a predefined threshold, or within a predefined threshold range;

capturing, by the second sensor, second data associated with the media item; and analyzing, by the second validator, the second data to determine if the media item is genuine or counterfeit; and directing the media item to a first storage area when determined to be genuine or to a second storage area when determined to be counterfeit based on results from one or more of the first validator and the second validator.

12. The method of claim 11, wherein capturing the first data further includes obtaining a first-resolution image of the media item from the first sensor.

13. The method of claim 12, wherein evaluating the first data further includes identifying features from the first-resolution image, calculating a score from the features, and comparing the score to a predefined threshold.

14. The method of claim 13, wherein capturing the second data further includes obtaining a second-resolution image of the media item from the second sensor, wherein the second-resolution image is of a higher resolution than the first-resolution image.

15. The method of claim 14, wherein analyzing further includes identifying features from the second-resolution image, calculating a score from the features, and comparing the score to a predefined threshold.

16. The method of claim 11, further comprising:

when the media item is determined to be genuine based on the evaluating by the first validator, directing the media item to the first storage area without activating the second sensor or the second validator.

17. A system comprising:

a media terminal;

a first sensor configured to capture first data associated with a media item inserted into the media terminal;

a second sensor configured to capture second data associated with the media item;

at least one processor; and a memory storing instructions that, when executed by the at least one processor, cause the system to:

evaluate, using a first validator, the first data to determine if the media item is potentially counterfeit;

when the media item is potentially counterfeit based on the evaluation by the first validator:

selectively activate the second sensor and a second validator during a same transaction, wherein the second sensor and second validator are activated based on a score generated by the first validator during the evaluation, and wherein the score is below a predefined threshold, above a predefined threshold, or within a predefined threshold range;

analyze, using a second validator, the second data to determine if the media item is genuine or counterfeit; and direct the media item to a first storage area when determined to be genuine or to a second storage area when determined to be counterfeit based on results from the first validator and the second validator.

18. The system of claim 17, wherein the first sensor is configured to capture a first-resolution image of the media item and the first validator is configured to identify first features from the first-resolution image.

19. The system of claim 18, wherein the second sensor is configured to capture a second-resolution image of the media item and the second validator is configured to identify second features from the second-resolution image, wherein the second-resolution image is of a higher resolution that the first-resolution image.

20. The system of claim 17, wherein the media terminal is an automated teller machine, a self-service terminal, or a point-of-sale terminal.

* * * * *